United States Patent
Monagle et al.

(10) Patent No.: US 6,803,068 B2
(45) Date of Patent: Oct. 12, 2004

(54) HIGHLY SOLUBLE, HIGH MOLECULAR WEIGHT SOY PROTEIN

(75) Inventors: Charles W. Monagle, Fort Wayne, IN (US); Carmen M. Darland, Fort Wayne, IN (US); Navpreet Singh, Fort Wayne, IN (US)

(73) Assignee: Solae, LLC, St Louis, MO (US)

( * ) Notice: Subject to any disclaimer, the term of this patent is extended or adjusted under 35 U.S.C. 154(b) by 263 days.

(21) Appl. No.: 10/079,306

(22) Filed: Feb. 20, 2002

(65) Prior Publication Data

US 2003/0054087 A1 Mar. 20, 2003

Related U.S. Application Data

(60) Provisional application No. 60/270,062, filed on Feb. 20, 2001.

(51) Int. Cl.[7] .................................................. A23L 1/20
(52) U.S. Cl. ........................ 426/656; 426/574; 426/634; 530/378
(58) Field of Search ................................ 426/656, 634, 426/574; 530/378

(56) References Cited

U.S. PATENT DOCUMENTS

| | | | |
|---|---|---|---|
| 3,897,574 A | | 7/1975 | Pass |
| 4,054,679 A | | 10/1977 | Melcer et al. |
| 4,234,620 A | | 11/1980 | Howard et al. |
| 4,284,656 A | | 8/1981 | Hwa |
| 4,346,122 A | | 8/1982 | Orthoefer et al. |
| 4,349,576 A | | 9/1982 | Lehnhardt et al. |
| 4,410,554 A | | 10/1983 | Sailer |
| 4,435,438 A | | 3/1984 | Lehnhardt et al. |
| 4,704,289 A | | 11/1987 | Scheide et al. |
| 5,097,017 A | | 3/1992 | Konwinski |
| 5,936,069 A | * | 8/1999 | Johnson ............ 530/378 |
| 6,653,451 B1 | * | 11/2003 | Kerr et al. ............ 530/378 |

FOREIGN PATENT DOCUMENTS

GB 1407773 9/1975

OTHER PUBLICATIONS

Abstract—XP–008004431 Chunyang Wang, "Hydrothermal processing of soy protein products." Dissertation Abstracts International, B 6000 Order No DA9414045, 129 PP. 1994, Thesis Publ. 1993 Iowa State Univ., Ames IA 50011, USA, vol. 54, No. 12.

* cited by examiner

*Primary Examiner*—Anthony Weier
(74) *Attorney, Agent, or Firm*—James L. Cordek

(57) ABSTRACT

A soy protein with a high molecular weight. The high molecular weight soy protein has desirable flavor and functional properties, such as high water solubility and emulsification and low sedimentation and viscosity. The method of manufacturing the protein uses soy flour and aggregates its low molecular weight proteins into high molecular weight proteins without using aqueous alcohol to modify the structure of the protein.

6 Claims, 1 Drawing Sheet

HIGHLY SOLUBLE, HIGH MOLECULAR WEIGHT SOY PROTEIN

CROSS REFERENCE TO RELATED APPLICATIONS

This application claims the benefit under Title 35, U.S.C. §119(e) of U.S. Provisional Patent Application Serial No. 60/270,062, entitled HIGHLY SOLUBLE, HIGH MOLECULAR WEIGHT SOY PROTEIN, filed on Feb. 20, 2001.

BACKGROUND OF THE INVENTION

1. Field of the Invention

This invention relates to a soy protein with a high molecular weight. The high molecular weight soy protein has desirable flavor and functional properties, such as high water solubility and emulsification and low sedimentation and viscosity.

2. Description of the Related Art

The benefits of soy protein are well documented. Cholesterol is a major concern with consumers throughout the industrialized world. It is well known that vegetable products contain no cholesterol. For decades, nutritional studies have indicated that the inclusion of soy protein in the diet actually reduces serum cholesterol levels in people who are at risk. The higher the cholesterol, the more effective soy proteins are in lowering that level.

Soybeans have the highest protein content of all cereals and legumes. In particular, soybeans have about 40% protein, while other legumes have 20–30%, and cereals have about 8–15% protein. Soybeans also contain about 20% oil with the remaining dry matter mostly carbohydrate (35%). On a wet basis (as is), soybeans contain about 35% protein, 17% oil, 31% carbohydrates, and 4.4% ash.

In the soybean, both storage protein and lipid bodies are contained in the usable meat of the soybean (called the cotyledon). The complex carbohydrate (or dietary fiber) is also contained in the cell walls of the cotyledon. The outer layer of cells (called the seed coat) makes up about 8% of the soybean's total weight. The raw, dehulled soybean is, depending on the variety, approximately 18% oil, 15% soluble carbohydrates, 15% insoluble carbohydrates, 14% moisture and ash, and 38% protein.

In processing, soybeans are carefully selected for color and size. The soybeans are then cleaned, conditioned (to make removal of the hull easier) and cracked, dehulled and rolled into flakes. The flakes are subjected to a solvent bath that removes the oil. The solvent is removed and the flakes are dried, creating the defatted soy flakes that are the basis of all soy protein products. Despite the large number of products on the market, there are only three types of soy protein: flours, isolates, and concentrates.

Soy flours are the simplest forms of soy protein, having a protein content of approximately 50%. Simply grinding and screening the defatted flakes produces soy flours. This simple processing leaves the soy flour with many of the soybean's characteristics. Essentially all of the protein of soy flour is in the native form, having a molecular weight of less than about 800,000, as depicted in FIG. 4. The lack of processing also makes soy flours highly variable in terms of quality.

Soy flours and grits are still widely produced and are used most often in baked goods, snack foods and pet foods applications where the high flavor profile does not pose a problem. Textured soy flours were an early attempt at simulating or enhancing the texture of meat products. Texturizing does not change the composition of soy flours and reduces the flavor profile only slightly. Their primary applications are inexpensive meat products or pet foods.

Isolates are produced through standard chemical isolation, drawing the protein out of the defatted flake through solubilization (alkali extraction at pH 7–10) and separation followed by isoelectric precipitation. As a result, isolates are 90% protein on a moisture-free basis. Isolates can be made with a high percentage of soluble protein and a low flavor profile. They contain no dietary fiber and are sometimes high in sodium, properties that can limit their application. Isolate processing is relatively complex and much of the soybean's protein is lost in the centrifuging process, so the cost of isolates is high. Their major applications have been in dairy substitution, as in infant formulas and milk replacers.

Soy concentrates have at least 60% protein and typically have about 70% protein. A myriad of applications has been developed for soy concentrates and texturized concentrates in processed foods, meat, poultry, fish, cereal and dairy systems.

Soy protein concentrates are made by removing soluble carbohydrate material from defatted soy meal. Aqueous alcohol extraction (60–80% ethanol) or acid leaching (isoelectric pH 4.5) are the most common means for carbohydrate removal. In both aqueous alcohol extraction and acid leaching, however, essentially all of the protein is rendered insoluble. Protein solubility may be recovered in acid leach products by neutralization.

U.S. Pat. No. 4,234,620 ("Howard et al.") describes a method for making water-soluble vegetable protein aggregates from aqueous alcohol extracted soy protein concentrates. The molecular weight profile of the soluble proteins of a product made using the Howard et al. method is depicted in FIG. 3. When viewed in relation to the molecular weight profile of unmodified commercial soy four (FIG. 4) it can be seen that a substantial amount of the soluble proteins in the Howard et al. product are converted to higher molecular weight aggregates.

Howard et al. describes soy products that have at most a nitrogen solubility index ("NSI") of 72. Howard et al. also describes high NSI soy proteins that have at most about 50% by weight of the soluble proteins, or at most about 36% of total proteins, with a molecular weight greater than one million. Further, Howard et al. describes soy protein aggregates that have a substantial portion of their proteins in the 1,000 to 380,000 molecular weight range.

SUMMARY OF THE INVENTION

The present invention comprises a vegetable material composition containing highly soluble, high molecular weight vegetable protein aggregates with the structure of the protein not having been modified with an organic solvent, such as aqueous alcohol. More specifically, the present method uses soy flour as a starting material, and aggregates the low molecular weight proteins of the soy flour into high molecular weight proteins without using an organic solvent, such as aqueous alcohol, to modify the structure of the protein.

It is an object of the present invention to make highly soluble, high molecular weight vegetable protein aggregates from soy flour and without using alcohol or other organic solvents to modify the structure of the proteins.

It is further an object of the present invention to produce high NSI soy protein aggregates that have as much as about three-fourths by weight of the soluble proteins, or as much as 64% of the total proteins, with a molecular weight greater than 800,000.

It is further an object of the present invention to produce soy proteins having an NSI greater than 85.

It is further an object of the present invention to make a soy protein product that is essentially absent of proteins in the 1,000 to 380,000 molecular weight range, such that the product contains predominantly high molecular weight protein aggregates and essentially no remainder of unmodified native protein.

It is further an object of the present invention to make soy proteins that have a low degree of sedimentation and a low viscosity.

In another embodiment, the present invention concerns a method for manufacturing a protein product comprising: a) providing a soybean material defatted with hexane; b) adjusting the pH of the material; c) heating the material at an effective temperature for an effective time; d) removing fiber from the material; e) heat treating the material; and f) drying the material. The product may then used in a liquid or dry beverage, food or nutritional product.

In one form thereof, the present invention provides a vegetable material composition comprising highly soluble, high molecular weight vegetable protein aggregates, wherein the structure of the proteins has not been modified with an organic solvent.

In another form thereof, the present invention provides a soy protein product made from a soy material having less than about 5% by weight of the protein in the material of a molecular weight greater than about 800,000, wherein a solvent is not used to modify the structure of the protein in the material, and wherein the product has at least about 55% by weight of protein of total dry matter of the product, a nitrogen solubility index (NSI) of at least about 85, and at least about 65% by weight of the protein in the product has a molecular weight greater than about 800,000.

In another form thereof, the present invention provides a method of making a soy protein product from a soy material, including the steps of slurrying the soy material in water, with the material being substantially defatted; adjusting the pH of the material; removing fiber from the material; and heating the material.

In another form thereof, the present invention provides a liquid or dry beverage, food or nutritional product, including a soy protein product made by a process including the steps of slurrying the soy material in water, with the material being substantially defatted; adjusting the pH of the material; removing fiber from the material; and heating the material.

In another form thereof, the present invention provides a vegetable material composition including highly soluble, high molecular weight vegetable protein aggregates, the composition having a nitrogen solubility index (NSI) greater than about 85.

In another form thereof, the present invention provides a vegetable material composition including highly soluble, high molecular weight vegetable protein aggregates, wherein about 75% by weight of the protein aggregates have a molecular weight greater than 380,000.

In still another form thereof, the present invention provides a vegetable material composition including highly soluble, high molecular weight vegetable protein aggregates, wherein at least about 65% by weight of the protein aggregates have a molecular weight greater than about 800,000.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 4:
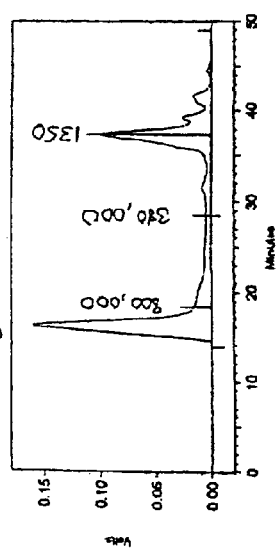
FIG. 4 depicts the molecular weight profile of commercial soy flour, wherein about all of the proteins therein have a molecular weight less than 800,000.

The exemplifications set out herein illustrate preferred embodiments of the invention, and such exemplifications are not to be construed as limiting the scope of the invention in any manner.

DETAILED DESCRIPTION

A vegetable material composition produced in accordance with the present invention includes highly soluble, high molecular weight vegetable protein aggregates with the structure of the protein not having been modified with a solvent, such as aqueous alcohol.

The present method for manufacturing a protein product includes: a) providing a soybean material defatted with hexane; b) adjusting the pH of the material; c) heating the material at an effective temperature for an effective time; d) removing fiber from the material; e) heat treating the material; and f) drying the material. The product may then used in a liquid or dry beverage, food or nutritional product.

The present method also generally encompasses: 1) dehulling whole soybeans; 2) flaking the dehulled soybeans; 3) extracting soybean oil from the flaked soybeans with hexane, a solvent; 4) desolventizing the defatted soybean flakes without high heating or toasting to produce "white" flakes; 5) grinding the flakes to make soy flour; and 6) removing fiber from the soy flour and its proteins. Steps 1 through 4 described above are commonly referred to as the extraction process for soybeans. The general procedure for the above-described steps 1 through 5 is well understood. See U.S. Pat. No. 5,097,017 to Konwinski and U.S. Pat. No. 3,897,574 to Pass, each assigned to the assignee of the present invention, the disclosures of which are expressly incorporated herein by reference; "Extraction of Oil from Soybeans," *J. Am. Oil Chem. Soc.*, 58, 157 (1981) and "Solvent Extraction of Soybeans," *J. Am. Oil Chem. Soc.*, 55, 754 (1978).

The first item described above is dehulling. Dehulling is the process in which the soybean hulls are removed from the whole soybeans. The soybeans are carefully cleaned prior to dehulling to remove foreign matter, so that product will not be contaminated by color bodies. Soybeans also are normally cracked into about 6 to 8 pieces prior to dehulling.

The hull typically accounts for about 8% of the weight of the whole soybean. The dehulled soybean is about 10% water, 40% protein, 20% fat, with the remainder mainly being carbohydrates, fiber and minerals.

The second step described above is the flaking process. Soybeans are conditioned prior to flaking by adjusting moisture and temperature to make the soybean pieces sufficiently plastic. The conditioned soybean pieces are passed through flaking rolls to form flakes about 0.25 to 0.30 millimeters (mm) thick.

The third step described above is removal of soybean oil from the flakes. The soybean flakes are defatted by contacting them with hexane to remove the soybean oil. Soybean oil is used in margarine, shortening and other food products, and is a good source of lecithin, which has many useful applications as an emulsifier.

In the fourth step described above, the hexane-defatted soybean flakes are desolventized (removing hexane), without toasting, to produce white flakes. This is different than conventional soybean oil hexane processes where the flakes are toasted and used for animal feed.

In the fifth step described above, the white flakes are ground to make soy flour. Soy flour that can be used as a starting material for the subject invention is readily, commercially available. Commercial soy flour typically would have at least 50% (52.5%) protein (NX 6.25); about 30–40% (34.6%) carbohydrates; about 5–10% (6%) moisture; about 5–10% (6%) ash; about 2–3% (2.5%) crude fiber and less than about 1% (0.9%) fat (ether extract).

The soy flour may have a protein dispersibility index (PDI) of 90, and wherein the soy flour is 80 mesh. PDI is determined by American Oil Chemist's Society (AOCS) method Ba 10–65. 90 PDI would be soy flour with no heat treatment that is enzyme active. 80 mesh means that greater than 95% of the soy flour passes through a number 80 mesh USA standard sieve.

The next step of the invention involves removing fiber from the material and aggregating its proteins. The starting material is first preferably slurried with water. In the preferred embodiment of this invention, the water is pre-heated. A suitable temperature is 50° C., and the slurry is about 10–20% solids.

It also usually is necessary to provide some agitation or mixing to slurry the starting material. One means for performing the mixing is a propeller-type agitator.

The next operation to be described is fiber removal to achieve at least 50–60% protein of total dry matter in the product, more preferred 66% protein with about 70% product yield. One means for removing fiber is adjusting the pH of the slurry to about 7–7.5, most preferred 7.4, with sodium hydroxide; heating to at least 32.2° C. for at least 30 minutes; and separating the slurry to form a cake and a liquor.

The separation can be performed by a number of physical separation means, such as by centrifugation using a decanting centrifuge, for example.

The fiber removed product is heat processed. One method of heat processing is jet cooking, which may preferably be carried out at a temperature of at least about 110° C. and above, or which may be carried out at a temperature of between 100 and 150° C. In yet another embodiment, the slurry could be held in a steam-jacketed kettle. Heat processing is performed to induce formation of protein aggregates, and also so that the product tests negative for salmonella and has an acceptable microbial profile. In yet another embodiment, the fiber removed product can be concentrated to higher protein levels, such as to about 80% protein of total dry matter, by ultrafiltration.

The product has many uses. For example, it can be used as a milk replacer and in drink mixes and beverages, such as chocolate, vanilla and pineapple beverages; dairy products, such as fruit yogurt; nutrition and health products, such as protein bars; whole muscle meat injection; surimi products; emulsified meats; cereal products, such as breakfast cereals; bakery products, such as blueberry muffins and other liquid or dry beverage, food or nutritional products.

The cake is optionally dried to form a high fiber byproduct. The byproduct would have about 20–25% protein.

The dried products may be coated with commercial lecithin or other food-grade surfactants, such as mono-diglycerides, to improve water dispersibility and reduce clumping of the product. Such a coating addition may be in the range of about 0.5% and may be performed by co-spray drying the liquor and coating material.

Methods and Standards
1. The NSI method is American Oil Chemists' Method Ba 11–65.
2. The PDI method is American Oil Chemists' Method Ba 10–65.
3. Solubility Index: described in Standard Grades For Dry Milks Including Methods of Analysis, Bulletin 916, American Dairy Products Institute.
4. Molecular Weight Method:

Molecular weight profiles were determined using a size exclusion column (Bio-Sil SEC-400, Catalog number 125-0064, Bio-Rad Laboratories, 3300 Regatta Blvd., Richmond, Calif., 94804) on a high performance liquid chromatography system. The mobile phase and extraction buffer contained 0.4 M NaCl, 0.1 M tris (Hydroxy Methyl Aminomethane) and 0.02% $NaN_3$, pH 7.60. The conditions of a sample run were: sample injection 20 $\mu$l; flow rate 0.3 ml/min, isocratic. Elution was monitored by a UV-Vis detector (Shimadzu SPD-10 Avp/10AVvp) at 292$\lambda$. The column was calibrated and standard curves were constructed for each run using proteins of known molecular weight thereby allowing the molecular weight of sample proteins to be evaluated (See P. Andrews (1965) *Biochem., J.*, 96, 595–606 "The Gel-Filtration Behavior of Proteins Related to Their Molecular Weight over a Wide Range"). The standard proteins which were included in a gel filtration standard kit (Catalog number 151-1901, Bio-Rad Laboratories) were thyroglobulin (bovine), gamma globulin (bovine), ovalbumin (chicken), myoglobin (horse) and Vitamin B 12.

For comparative purposes, molecular weight zones were chosen by use of protein molecular weight standard curves. These zones were as follows: >8×10; <8×10>1350; and <1350. These zones were integrated as peak areas using Shimadzu Chromatography software (Class-VP v 5.032). Peaks which occurred in the zone of <1350 were considered as non protein peaks largely made up of soluble soy sugars. Only the areas under protein peaks (those >1350) were used to calculate percentages of total protein occurring in specific zones.

Samples were prepared for chromatography by the following method: A 10 g sample was extracted for one hour at room temperature in extraction buffer. Samples were initially dispersed with a spatula using slow stirring. Dispersion of some samples was aided by spraying a small amount of Pam anti-stick product into the container prior to sample addition. Following dispersion, samples were mixed with magnetic stirring for nine minutes after which time pH was adjusted to 7.6 with 10 N NaOH. Magnetic stirring was continued for 50 minutes. Samples were centrifuged at 12,000×g for 30 min at 10° C. and aliquots of the supernatants were injected on the size exclusion column.

5. Viscosity Method:

450 g of water were weighed into an 800 ml beaker containing 50 g of protein product. The mixture was blended with a Biomixer Blender with stirring attachment (Biospec Products, Box 722, Bartlesville, Okla., 74005, Fisher Scientific catalog no. 11-504-204) on speed II for 15 seconds. The sides of the beaker were scraped down with a spatula to resuspend non-blended material. Blending was continued for 15 seconds more. The contents were allowed to rest for 10 minutes after which any foam layer was removed by aspiration. Viscosity was determined using a Brookfield Viscometer (Model LVT) with Spindle number 1 at 60 rpm. The average of two readings, each taken at 60 seconds of spinning, was used to calculate centipoise from a conversion chart.

These and other aspects of the present invention may be more readily understood by reference to one or more of the following examples.

EXAMPLES

Example 1

22.7 kg of soy flour having a protein dispersibility index (PDI) of 86 was dispersed in 235.4 kg of water at 32.2° C. and the pH was adjusted to 7.5 using sodium hydroxide. The suspension was mixed for 30 minutes at 32.2° C., and then centrifuged in a decanting centrifuge at 6000 revolutions per minute (rpm) and a differential screw speed of 6 rpm. The insoluble centrifuge cake was discarded, and the supernatant was heat treated by passing through a jet cooker at 115° C. with a holding time of 15 seconds. The suspension was then cooled to 140° F. in a jacketed vessel, and the pH was adjusted to 7.4 using hydrochloric acid. The suspension was then spray dried. The spray dried product contained 59.0% protein, 1.5% crude fiber, 0.2% fat, 8.0% ash, and 3% moisture.

Figure 1:
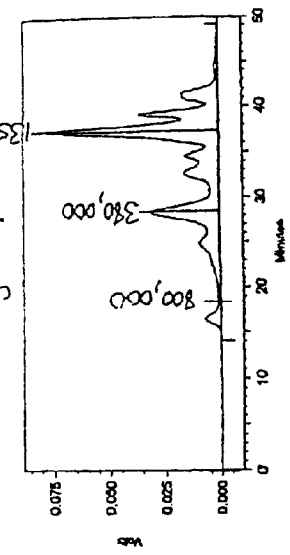
FIG. 1 depicts the molecular weight profile of a product made in accordance with one embodiment of the present invention, wherein the fiber was removed from soy flour and the proteins aggregated to make a soy protein concentrate having high molecular weight protein aggregates, such that about 75% of the proteins have a molecular weight greater than 800,000.

The molecular weight profile of product, determined as discussed in the Methods and Standards section above, is shown in FIG. 1, wherein about 75% of the proteins in the product have a molecular weight greater than 800,000.

Example 2

22.7 kg of soy flour having a protein dispersibility index (PDI) of 86 was dispersed in 235.4 kg of water at 60° C. and the pH was adjusted to 7.5 using sodium hydroxide. The suspension was mixed for 30 minutes at 60° C., and then centrifuged in a decanting centrifuge. The insoluble centrifuge cake was discarded, and the supernatant was heat treated by passing through a jet cooker at 121° C. with a holding time of 15 seconds. The suspension was then cooled to 48.9° C. in a jacketed vessel, and the pH was adjusted to 7.0 using hydrochloric acid. The suspension was then ultrafiltered using a 10,000 molecular weight cutoff (MWCO) spiral wound membrane to remove about 75% of the feed volume as permeate. The retentate from the membrane was heat treated by passing through a jet cooker 93.3° C. with a holding time of 15 seconds. The retentate was then cooled to 60° C. in a jacketed vessel and spray dried.

The retentate had the following composition:

| Protein (dry basis) (%) | 79.79 |
| Moisture (%) | 1.23 |
| Ash (as is) (%) | 6.87 |
| Crude fiber (as is) (%) | 0.8 |
| Nitrogen Solubility Index (NSI) | 96.99 |

Example 3

A product made according to Example 1; a product made according to Example 1 without jet cooking; a product made according to Example 2; a sample of high PDI defatted soy flakes (Central Soya Company); and a commercial soy protein isolate (SUPRO 500 E, Protein Technologies, Incorporated) were each extracted according to the molecular weight method described above. Aliquots of extractable (soluble) material were then subjected to size exclusion chromatography as previously described. The resulting molecular weight profiles, protein solubility profiles, and solubility index profiles are shown in the following table.

TABLE 1

| | % Distribution of Protein Molecular Weight in Buffer Soluble Fractions | | | | |
| --- | --- | --- | --- | --- | --- |
| Protein Molecular Weight | Experimental Product from Example 1 | Experimental Product from Example 1 without jet cooking | Experimental Product from Example 2 | High PDI defatted soy flakes | Soy Protein Isolate |
| >800,000 | 73.5 | 8.8 | 74.5 | 1.3 | 15.6 |
| <800,000 | 26.5 | 91.2 | 25.5 | 98.7 | 84.4 |
| Protein Solubility | 88 (NSI) | 90 (NSI) | 90 (NSI) | 90 (PDI) | 70 (NSI) |
| Solubility Index | 0.5 mL sediment | 0.5 mL sediment | 0.5 mL sediment | (not determined) | 20 mL sediment |

Figure 6:
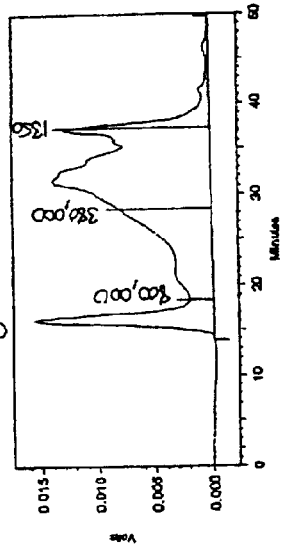
FIG. 6 depicts the molecular weight profile of a product made in accordance with another embodiment of the present invention, similar to that shown in FIG. 1, but without jet cooking, wherein about 92% of the proteins in the product have a molecular weight less than 800,000.

The molecular weight profile of product from Example 1 without jet cooking, determined as discussed in the Methods and Standards section above, is shown in FIG. 6, wherein about 92% of the proteins in the product have a molecular weight less than 800,000.

Figure 5:
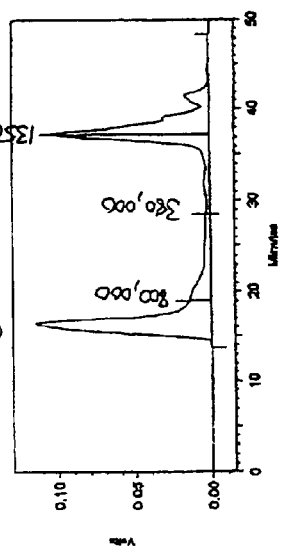
FIG. 5 depicts the molecular weight profile of a commercial soy protein isolate, wherein about 85% of the proteins therein have a molecular weight less than 800,000.

The molecular weight profile of the above commercial soy protein isolate, determined as discussed in the Methods and Standards section above, is shown in FIG. 5, wherein about 85% of the proteins therein have a molecular weight less than 800,000.

Example 4

Test product made according to the procedure of Example 1 was compared in viscosity to a commercial soy protein concentrate, and two commercial soy protein isolates, one having high viscosity and one low viscosity. The viscosity method described above was used for the test product, the concentrate and the low viscosity isolate. A similar method using a Brookfield Model RVT viscometer was used for the high viscosity isolate. The results are given in the table below.

TABLE 2

VISCOSITY (Centipoise)

| Example 1 Product | Commercial Soy Protein Concentrate | Commercial Soy Protein Isolate Low Viscosity | Commercial Soy Protein Isolate High Viscosity |
|---|---|---|---|
| 8 | 88 | 16 | 300 |

Example 5

Figure 2:
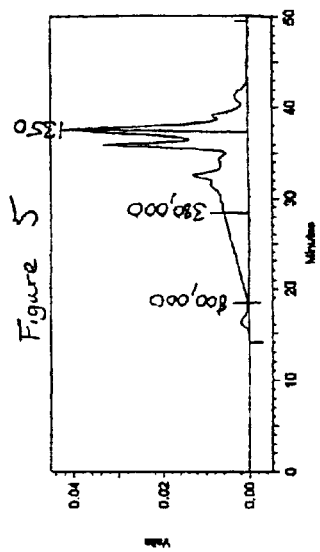
FIG. 2 depicts the molecular weight profile of a product made in accordance with another embodiment of the present invention, wherein the carbohydrate profile of the invention was modified with an enzyme.
Figure 3:
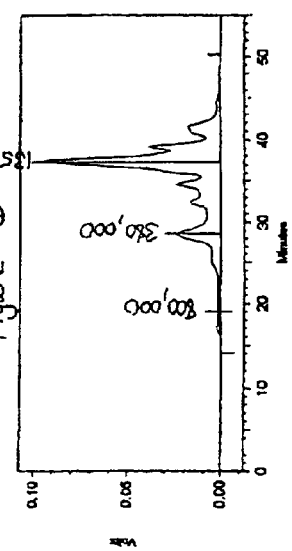
FIG. 3 depicts the molecular weight profile of a commercial soy protein concentrate made according to the method of Howard et al. (U.S. Pat. No. 4,234,620)

The product having the molecular weight profile depicted in FIG. 2, in which the carbohydrate profile was modified by an enzyme, was made as follows.

22.7 kg of soy flour, having a protein dispersibility index (PDI) of 86 was dispersed in 235.4 kg of water at 60° C., and the pH was adjusted to 6.0 using hydrochloric acid. 22.7 g of alpha-galactosidase enzyme (VALIDASE AGS 25 concentrate, Valley Reasearch, Inc., South Bend, Ind.) was added to the suspension, which was then mixed for 2 hours. The pH of the suspension was then adjusted to 7.0 using sodium hydroxide, and then centrifuged in a decanting centrifuge at 6000 revolutions per minute (rpm) and a differential screw speed of 6 rpm. The insoluble centrifuge cake was discarded, and the supernatant was heat treated by passing through a jet cooker at 115° C. with a holding time of 15 seconds. The suspension was then spray dried. The spray dried product contained 58.5% protein, 1.5% crude fiber, 0.2% fat, 8.5% ash, and 4% moisture.

Example 6

The product from Example 2 was used to make vegetarian meat analogs with 0.5% fat and 3.0% fat (vegetable oil), as set forth in the table below:

TABLE 3

| Formula | % | % |
|---|---|---|
| Water | 62.34 | 63.34 |
| Protein product from Example 2 | 17 | 17 |
| Vital Wheat Gluten[1] | 10 | 5 |
| Inulin | 2 | 4 |
| Sugar | 2 | 2 |
| Salt | 1.91 | 1.91 |
| Methylcellulose[2] | 1.5 | 1.0 |
| Beef Flavor 535557[3] | 1.25 | 1.25 |
| Crusty Fatty Pork Flavor 535087[3] | 1.25 | 1.25 |
| Vegetable oil | 0.5 | 3 |
| Hot Dog Flavor[3] | 0.25 | 0.2 |

[1]Midwest Grain Products, Inc.
[2]Dow Chemical Company
[3]Givaudan Roure

A pregel was formed by mixing all of the inulin (18.1 g) with 420.5 g of water. The other ingredients, except oil, were then mixed with the remaining water at 0° C. under vacuum in a Stephan cutter mixer, Model UMC 5 Electronic at 2400 rpm for 90 seconds. The inulin premix and oil were then added, followed by an additional 90 seconds of mixing. The mix was filled into frankfurter casing, linked, then dipped into liquid smoke type P24 which was mixed with 1 part smoke to 10 parts water. The mix was then heat processed in an ALKAR smokehouse according to the following schedule: 8 min. with dry bulb 73.9° C., wet bulb 55.5° C.; 10 min. with dry bulb 82.2° C., wet bulb 70.6° C.; 10 min. with dry bulb 87.8° C., wet bulb 82.2° C.; 11 min. with dry bulb 93.3° C., wet bulb 93.3° C. to internal temperature of 87.8° C.; cold shower 30 min. with dry bulb 68.3° C., wet bulb 51.2° C.

The precook mixture which used the protein product described in Example 2 had a semi fluid consistency which mixed easily, was pumpable and was easily filled into frankfurter casings. The precook mixture which used soy protein isolate was highly viscous and was difficult to fill into frankfurter casings. The resulting products made using the protein product of Example 2 had a firm but resilient texture and mouthfeel and flavor which closely resembled traditional frankfurters. Products made using soy protein isolate were firm but lacked the resilient mouthfeel and texture of traditional frankfurters.

Example 7

Soy milk beverages, including the ingredients set forth in the table below, were made from the product of Example 2 and a soy protein isolate (SUPRO 760, Protein Technologies, Inc., St. Louis, Mo.).

TABLE 4

| Formula | *Product from Example 2 % | *Soy protein isolate % |
|---|---|---|
| Water | 89.756 | 90.10 |
| Protein product* | 3.832 | 3.29 |
| Sucrose | 3.792 | 4.00 |
| Soybean Oil | 1.237 | 1.23 |
| Carboxymethylcellulose | 0.480 | 0.48 |
| Calcium Carbonate | 0.299 | 0.30 |
| Vanilla flavor | 0.400 | 0.40 |
| Butterscotch flavor | 0.08 | 0.08 |
| Sodium chloride | 0.08 | 0.08 |
| Carrageenan | 0.04 | 0.04 |
| Vitamin premix (A/D/B$_2$/B$_{12}$) | 0.004 | — |
| | 100.000 | 100.00 |

100% of the water was heated to 65.6° C. and maintained at 65.6° C. with agitation until all ingredients were added. The protein product was added with agitation and mixed until dissolved. Sucrose, carboxymethylcellulose and carrageenan were dry blended then added to the protein slurry and mixed until dissolved. Calcium carbonate and sodium chloride were added and dispersed. The soybean oil was then added followed by the flavors and vitamin premix. The pH of the system was adjusted to 6.80 to 7.00 using HCl or NaOH as needed. The products were then processed in an ultra high temperature short time processor at 143° C. for 10 seconds. Then, the products were homogenized in a 2 stage homogenizer at 2000/500 psi, cooled and filled into clean bottles, and stored in a refrigerator.

The product made using the product from Example 2 had a smooth, clean mouth feel, bland flavor with an absence of soy notes and showed no evidence of separation or layering after several weeks of refrigerated storage. The product made from soy protein isolate showed no separation initially, but after one week of storage, a slight oil layer formed at the surface. Although the flavor and mouthfeel of the soy isolate product was judged good, bitter, astringent and metallic flavor notes were detected which were even more evident after one week of storage. The soy isolate product was higher in viscosity as judged by a taste panel.

Example 8

A liquid coffee whitener, including the ingredients set forth in the table below, was formulated from the product of Example 2.

TABLE 5

| Ingredient | % |
|---|---|
| Water | 79.87 |
| Soybean Salad Oil | 11.22 |
| Protein product from Example 2 | 1.09 |
| Corn syrup solids | 3.96 |
| Lecithin (CENTROPHASE HR-2B, Central Soya Co, Inc.) | 0.51 |
| Sucrose | 3.04 |
| Dipotassium Phosphate | 0.31 |
|  | 100.00 |

The lecithin was first dispersed in the oil, then the dipotassium phosphate was dissolved in the water. The protein product was then dispersed in the water with agitation, followed by the addition of the corn syrup solids, sucrose and lecithin-oil mix. The mix was then heated to 71° C., held at this temperature for 30 minutes, and then cooled to 63° C. The mix was then homogenized in a 2 stage homogenizer at 2000/500 psi, followed by rapid cooling to 4° C. and storage at this temperature.

The product was evaluated by microscopic examination and resistance to separation under centrifugation. The product of Example 2 showed good surfactant properties in that the product showed a uniform dispersion of spherical fat droplets with diameter of less than 10 microns which did not separate after one week of refrigerated storage nor under centrifugation at 2000 rpm for 10 minutes.

While this invention has been described as having preferred embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A soy protein product, comprising:

a Nitrogen Solubility Index ("NSI") of at least about 85; and a protein content of from about 65.0 wt. % to about 85.0 wt. %, wherein at least about 65.0 wt. % of said proteins have a molecular weight of greater than about 800,000 and essentially none of said proteins have a molecular weight of between about 1,000 and about 380,000.

2. The soy protein product of claim 1, wherein a dispersion of said soy protein product in water at an amount of about 10.0 wt. % solids at 21° C. has a viscosity of between about 6.0 and about 40.0 centipoise.

3. The soy protein product of claim 1, wherein said soy protein product has a solubility index of less than about 1.0 mL.

4. The soy protein product of claim 1, wherein said soy protein product has a crude fiber content of less than about 1.5 wt. %.

5. A meat analog product, including the soy protein product of claim 1.

6. A dairy product, including the soy protein product of claim 1.

* * * * *